US007680303B2

(12) United States Patent
Porikli et al.

(10) Patent No.: US 7,680,303 B2
(45) Date of Patent: Mar. 16, 2010

(54) IMAGE REGISTRATION USING JOINT SPATIAL GRADIENT MAXIMIZATION

(75) Inventors: Fatih M. Porikli, Watertown, MA (US); Xue Mei, College Park, MD (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 856 days.

(21) Appl. No.: 11/519,136

(22) Filed: Sep. 11, 2006

(65) Prior Publication Data

US 2008/0063300 A1 Mar. 13, 2008

(51) Int. Cl.
*G06K 9/00* (2006.01)
(52) U.S. Cl. .................. 382/107; 382/176; 382/294
(58) Field of Classification Search ............ 382/107, 382/128–130, 151, 176, 236, 272, 294; 348/263, 348/745; 399/301, 372, 394; 430/22
See application file for complete search history.

(56) References Cited

U.S. PATENT DOCUMENTS

| 6,641,536 | B2 * | 11/2003 | Hossack et al. ............ 600/443 |
| 7,068,826 | B2 * | 6/2006 | Jabri et al. .................. 382/128 |
| 7,567,695 | B2 * | 7/2009 | Frost et al. .................. 382/129 |
| 2005/0111718 | A1 * | 5/2005 | MacMahon et al. ......... 382/130 |

OTHER PUBLICATIONS

Buzug et al., Motion Detection and Motion Compensation for Digital Subtraction Angiography Image Enhancement, 1998, Philips Journal of Research, vol. 51, No. 2, pp. 203-229.*

* cited by examiner

*Primary Examiner*—Matthew C Bella
*Assistant Examiner*—Dennis Rosario
(74) *Attorney, Agent, or Firm*—Dirk Brinkman; Gene Vinokur

(57) ABSTRACT

A method registers images by first determining spatial gradient magnitudes for each pixel in each image to provide a corresponding energy image. Each energy image is transformed according to motion parameters associated with the energy image. An average sum of the transformed energy images is maximized. The motion parameters are then updated according to the maximized average sum. The above steps are repeated until a termination condition is reached, and then the images can be registered with each other according to the updated motion parameters.

9 Claims, 2 Drawing Sheets

200

IMAGE REGISTRATION USING JOINT SPATIAL GRADIENT MAXIMIZATION

FIELD OF THE INVENTION

This invention relates generally to image registration, and more particularly to registering images based on spatial gradient magnitudes.

BACKGROUND OF THE INVENTION

In computer vision applications, image registration establishes a common frame of reference for a set of images acquired of a scene from different views and different cameras. Typically, image registration is required for video tracking, medical imaging, remote sensing, super-resolution and data fusion.

In general, image registration methods can be direct or feature-based. Direct methods use pixel-to-pixel matching and minimize a measure of image dissimilarity to determine a parametric transformation between two images. Often, hierarchical approaches are used to improve convergence.

Feature-based methods first extract distinctive features from each image. Then, the features are matched to establish feature correspondences. The images are then warped according to a parametric transformation estimated from the correspondences. Unlike direct methods, feature-based registration does not require initialization and is able to handle large motion and viewpoint changes between the images. However, extracting distinctive features, which are invariant to illumination, scale and rotation, is difficult.

A scale invariant feature transform (SIFT) can be used to register images. SIFT is insensitive to the ordering, orientation, scale and illumination of the images.

Images to be registered can be acquired with different cameras and imaging modalities, visible and infrared (IR). Due to different characteristics of the multi-model imaging sensors, the relationship between the intensities of corresponding pixels in multi-modal images can be complex and unknown.

Conventional intensity based feature extraction fail in the case of multi-modal images. The features that appear in one image might not be present in other images. For example, an IR image of a painting appears to be homogenous because all the different colored paints have the same IR radiance.

Mutual information can be used for registering multi-modal images. Mutual information relies on the dependence of the distribution of the intensities of matched pixels, instead of the similarities of intensities of corresponding pixels.

Geometric properties, such as contours, edges, and corners can also be used to register images. Global estimation can be used to improve convergence to the common geometric properties.

Another method registers images by iteratively minimizing orientation displacements of pixels with large intensity gradients. However, most prior art methods assume that the displacement between multi-modal images is small, and that the features are highly correlated.

SUMMARY OF THE INVENTION

The embodiments of the invention provide a method for registering multi-modal images. The method does not require does an explicit initialization.

The method uses a joint gradient similarity function that is applied only to a set of pixels with large spatial gradient magnitudes. These pixels are assumed to denote depth discontinuities, which indicate mutually observable differences in different type of images, e.g., visible color and thermal IR images.

The method obtains motion parameters by maximizing a similarity function by a gradient ascent procedure, which provides fast convergence even with large displacements within the images.

The method can be used with affine-based image registration of 2D images, which undergo large rigid motion.

DETAILED DESCRIPTION OF THE PREFERRED EMBODIMENTS

Image Registration

Figure 1:
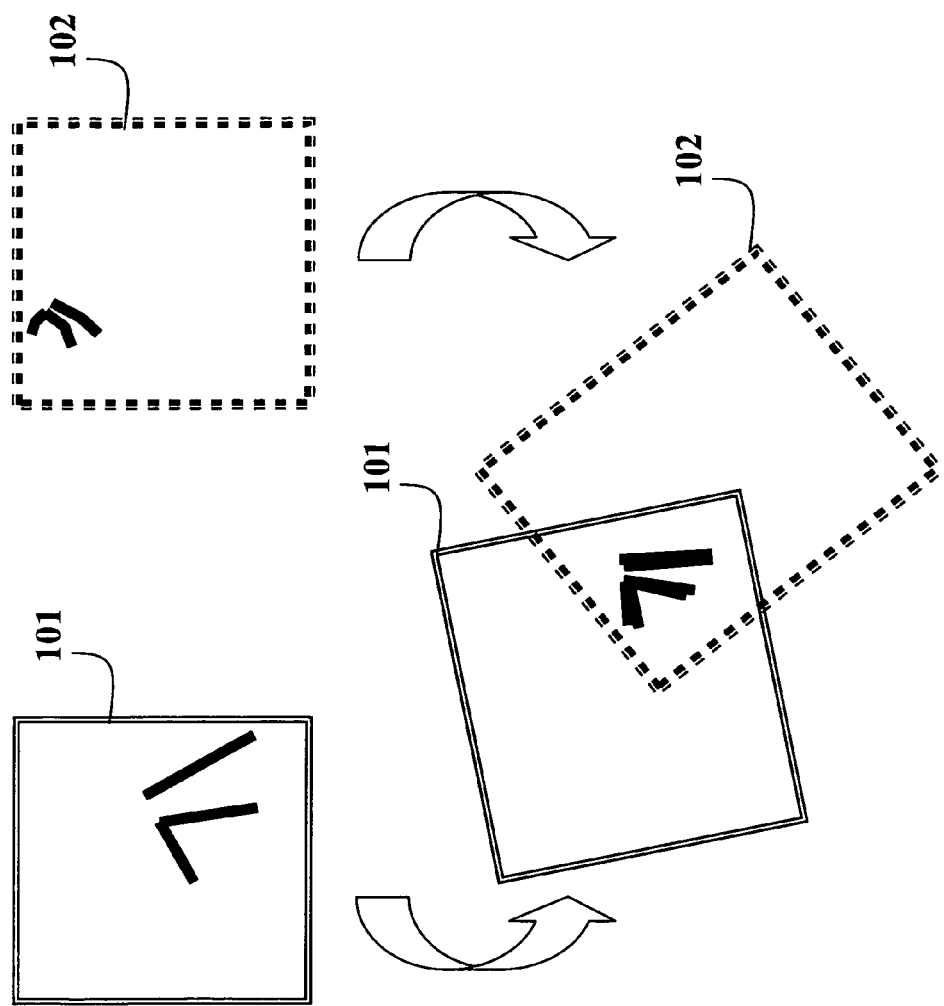
FIG. 1 is a block diagram of images registered according to an embodiment of the invention.

As shown in FIG. 1, the embodiments of the invention provide a method for registering images 101-102 acquired by different cameras. The method maximizes spatial gradient magnitudes that are indicative of spatial features, such as edges 103, in the images. Note, that the images 101-102, as a whole, have very little in common. In, addition, common features can have quite different pixel intensities due to the different viewpoints and different response characteristics of the camera sensors. Therefore, conventional based intensity based image registration may not apply. In a typical application, a sequence of images (video) are acquired by each camera, and the task is to register the sequences of images. In the sequences, the cameras can undergo camera motion.

Motion Parameters

Motion transform parameters p can be estimated from images by minimizing intensity differences of pixels in an input image $I_1(x, y)$ and a (warped) output image $I_2(x, y, p)$.

Conventional image registration typically performs image registration on a set S of images by performing a transformation using motion parameters p, which can be expressed as $$p^* = \operatorname*{argmin}_{p} \sum_{(x_i, y_i) \in S} (I_1(x_i, y_i, p) - I_2(x_i, y_i))^2, \qquad (1)$$

where $I_1(x_i, y_i, p)$ and $I_2(x_i, y_i, p)$ are intensities at pixels with corresponding coordinates. The set S includes some pixels that are at least common among the images. Gradient descent can then be used to minimize the motion parameter by solving a least square linear equation.

Instead, we register images acquired with different imaging modalities by maximizing a joint spatial gradient function.

Here, pixels that are associated with spatial features, e.g., edges, are assigned a magnitude of one, and non-edge pixels have a magnitude of zero. A total energy in an averaged sum of the correctly registered images is larger than a total energy obtained for incorrect registration of the images.

Maximizing joint spatial gradient magnitudes, instead of minimization intensities is more accurate because the same image features do not necessarily appear in both images. In other words, we assume that the spatial features, i.e., the gradient magnitudes, remain the same after motion compensation between the images.

By maximizing the joint spatial gradient magnitudes, we obtain the parametric motion transformation parameters p. We define the motion parameters p as $$p^* = \operatorname*{argmin}_{p} \sum_{(x_i, y_i) \in S} (E_1(x_i, y_i, p) + E_2(x_i, y_i))^2, \quad (2)$$

where $E_1$ and $E_2$ represent the edge (or energy) images of the input images $I_1$ and $I_2$. The energy images can be obtained by applying the well known Canny edge detector or a Sobel operator, or other similar first and second order edge detection methods.

Edges are associated with pixels having large gradient magnitudes, usually due to depth (spatial) discontinuities. Applying maximization to the set of edge pixels improves the performance of our method, particularly when applied to multi-modal images.

Gradient Ascent Motion Estimation

A joint gradient function $$F(p) = \sum_{(x_i, y_i) \in S} (E_1(x_i, y_i, p) + E_2(x_i, y_i))^2. \quad (2.5)$$

is nonlinear with respect to the parameter p. An iterative function for a gradient ascent can be expressed as $$p_{n+1} = p_n - (\nabla F(p))^{-1} F(p), \quad (3)$$

where $p_n$ are the motion parameters after the $n^{th}$ iteration, and the gradient magnitude $\nabla F(p)$ is the derivative of $F(p)$ with respect to the parameter p. The function can be determined as $$p_{n+1} = p_n - (H^T H)^{-1} H^T E_n, \text{ where} \quad (4)$$

$$H_{j,i} = \frac{\partial E_1(x_i, y_i)}{\partial p_j} \text{ and } E_{n,i} = E_1(x_i y_i, p_n) + E_2(x_i, y_i).$$

Motion Models

When a scene is approximated by a plane, i.e., the distance between viewpoints of multiple cameras is small relative to their distance from the scene, the motion between two images can be modeled with a 2D transformation parameters.

Let $\vec{p} = (p_1, p_2, \ldots, p_m)$ be an unknown parameter vector. For an affine transformation, the model is given by $$x_i^2 = p_1 x_i^1 + p_2 y_i^1 + p_3, \; y_i^2 = p_4 x_i^1 + p_5 y_i^1 + p_6, \quad (5)$$

where $x_i^1, y_i^1$ and $x_i^2, y_i^2$ are respectively the pixel coordinates before and after the transformation, and $p_3$ and $p_6$ are translational parameters.

In this case, the parameter vector becomes $$\vec{p} = (p_1, p_2, p_3, p_4, p_5, p_6)^T.$$

The projective model is given by $$x_i^2 = \frac{p_1 x_i^1 + p_2 y_i^1 + p_3}{p_7 x_i^1 + p_8 y_i^1 + 1}, \quad y_i^2 = \frac{p_4 x_i^1 + p_5 y_i^1 + p_6}{p_7 x_i^1 + p_8 y_i^1 + 1}, \quad (6)$$

where the parameter vector is $$\vec{p} = (p_1, p_2, p_3, p_4, p_5, p_6, p_7, p_8)^T,$$

and T is the transform operator.

Method Operation

Figure 2:
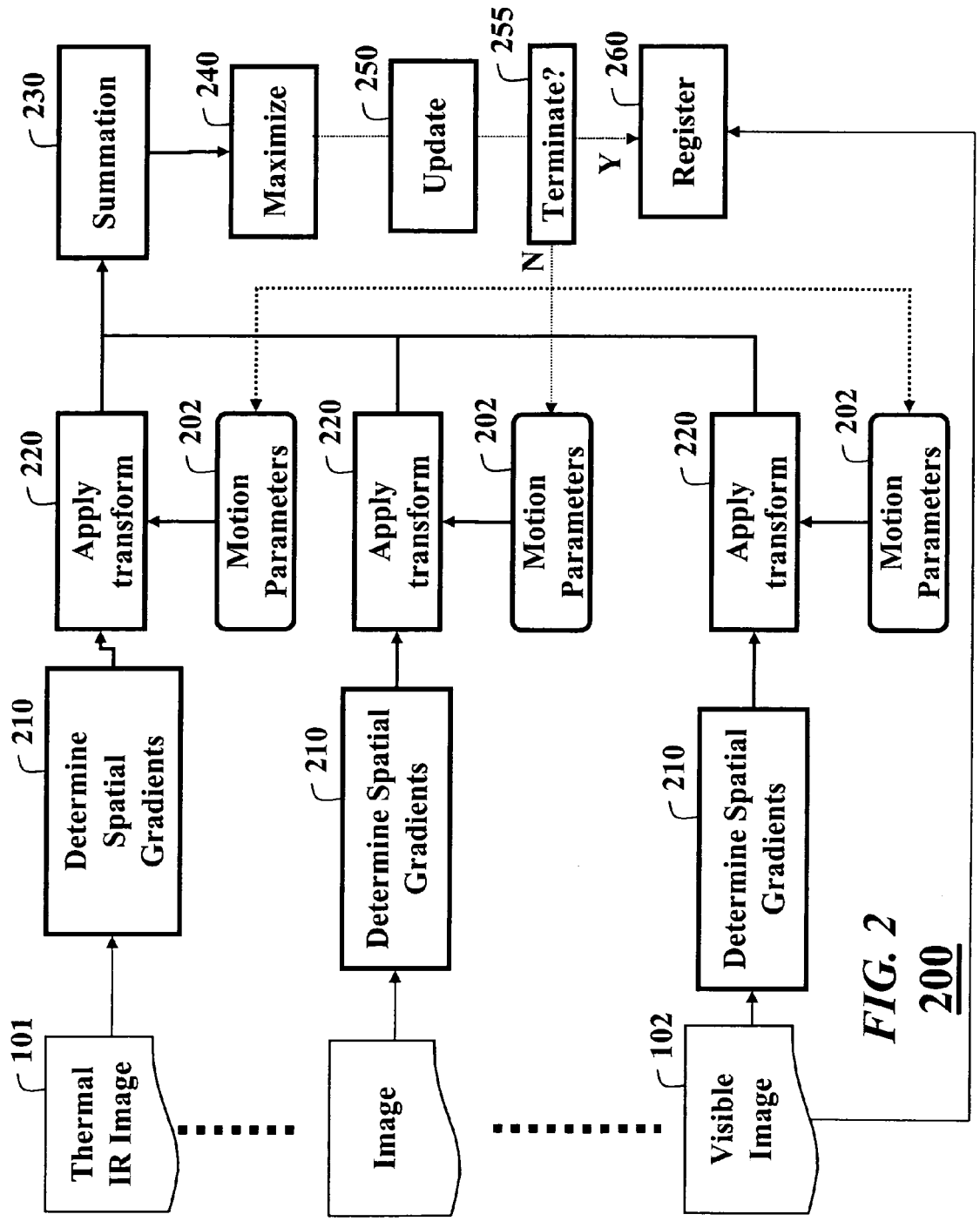
FIG. 2 is a flow diagram of a method for registering images according to an embodiment of the invention.

FIG. 2 shows a method 200 for registering multi-modal images according to an embodiment of the invention. Multi-modal images $I_n$ 101-102 of a scene are acquired by different cameras. It is assumed that the image sensors in the cameras can have different response characteristics. The cameras can also be at different viewpoints. The images can include visible (color), near IR, thermal IR, raster scanners, and X-ray images.

Initial values for the motion parameters 202 are $p_0$. The initial parameters can be set manually or by a conventional initialization procedure. For video data, the motion parameters computed for a previous time instant are used as initial values for the current motion parameters. In addition, Kalman filtering can be applied to a set of the previous motion parameters to predict the current initial values.

After n iterations, the final updated values are $p_n$. These final updated motion parameters are then used to register the images.

Spatial gradient magnitudes $E_n$ are determined 210 for each image $I_n$ by applying an edge detector, e.g., the well known Sobel filter or a Canny edge detector. The gradient magnitudes can be computed using spatial frequency transforms, e.g., Gabor filters, Fourier transform, and discrete cosine transforms, in a local window around each pixel.

It should be noted that the gradient magnitudes can also be determined form depth images corresponding to the input images. That is these gradients represent a rate of change of depth values.

The gradient magnitudes form corresponding gradient or energy images. The energy images can be determined by summing the gradient magnitudes in a local neighborhood (window) of each pixel. That is the window is moved over the pixels, in a raster scan order, so that adjacent windows overlap. A size and shape of the window can be adjusted to maximize performance.

A subset of pixels is selected to form the energy images. That is, the selected pixels have energies larger than a threshold. As stated above, the selected pixels are assigned a value of one, and all other pixels are assigned a value of zero, see FIG. 1. In a preferred embodiment, the number of the pixels in the subset is set by a target computation time.

The energy images are smoothed by applying a Gaussian filter. As stated above, the initial gradient magnitudes are thresholded to produce zero and one values. The Gaussian filter smoothes the one values. In a preferred embodiment, the Gaussian filters have an elliptical cross section, with a major axis aligned along the direction of the camera motion.

A non-symmetrical smoothing filter such as Chi-square function can also be applied instead of the Gaussian filter to adjust the convergence speed of the registration process.

The $k^{th}$ ($1 \leq k \leq n$) iteration of the method 200 proceeds as follows.

Each energy image is transformed 220 using the current estimated motion parameters $p_k$ 202 The transformed energy image is stored as $\hat{E}_n$.

The joint gradient (energy) sum, as determined by Equation (2.5), is divided by the energies of the selected pixels within the overlapping area to obtain the joint average gradient (energy) sum. It is also possible to divide the previous sum by the number of the selected pixels (with one values) within the overlapping area.

All the energy images are summed 230 as described above for Equation (2.5). The summed images are maximized 240 as described for Equation (3). The parameters 202 are then updated 250, and the next iteration is performed with the updated parameters beginning at steps 210.

The iterations are repeated until a predetermined termination condition 255 is reached, for example, a specific number of iterations, or until a difference of between consecutive iterations is smaller than a threshold.

At this point, the updated motion parameters can be used to register 260 the images 101-102 with each other.

Multi-Scale Scheme

To improve speed and accuracy, the method can use a coarse-to-fine hierarchy of images. The original images form the lowest level of the hierarchy. A spatial multi-resolution pyramid is constructed for each image. Each pyramid level is constructed by applying a low-pass filter to a lower level, followed by sub-sampling the image by a factor of two to construct a higher level in the hierarchy.

The estimation, as described above, is performed for each level and goes "up" to a finer higher level using the estimated parameters as an initial guess.

For initial non-zero values, we seek only for the translational parameters $p_3$ and $p_6$, leaving all the other parameters to be zeros.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for registering a plurality of images, comprising the steps of:

determining a spatial gradient magnitude for each pixel in each image to determine a corresponding energy image;

transforming each energy image according to motion parameters associated with the energy image;

maximizing an average sum of the transformed energy images;

updating the motion parameters according to the maximized average sum;

repeating the transforming, maximizing and updating steps until a predetermined termination condition is reached; and registering the plurality images with each other according to the updated motion parameters.

2. The method of claim 1, in which the images are acquired with different imaging modalities.

3. The method of claim 1, in which only pixels having a gradient magnitude larger than a threshold are selected to determine the corresponding energy images.

4. The method of claim 1, in which the maximizing uses a gradient ascent procedure.

5. The method of claim 1, in which a plurality of sequences of images are registered with each other.

6. The method of claim 1, in which the gradient magnitudes represent spatial features in the images.

7. The method of claim 1, in which the spatial gradients are obtained from depth images.

8. The method of claim 1, further comprising:

initializing the motion parameters.

9. The method of claim 1, in which the plurality of images include a color image and an infrared image.

\* \* \* \* \*